US012745038B2

(12) United States Patent
Harada

(10) Patent No.: US 12,745,038 B2
(45) Date of Patent: Sep. 22, 2026

(54) SPEAKER SYSTEM FOR A VEHICLE, INCLUDING ONE SPEAKER CONNECTED TO A FIRST-ORDER HIGH PASS FILTER AND ANOTHER SPEAKER CONNECTED TO A SECOND-ORDER LOW-PASS FILTER

(71) Applicant: YAMAHA CORPORATION, Hamamatsu (JP)

(72) Inventor: Hideki Harada, Kakegawa (JP)

(73) Assignee: YAMAHA CORPORATION, Hamamatsu (JP)

( * ) Notice: Subject to any disclaimer, the term of this patent is extended or adjusted under 35 U.S.C. 154(b) by 443 days.

(21) Appl. No.: 18/057,848

(22) Filed: Nov. 22, 2022

(65) Prior Publication Data

US 2023/0171544 A1 Jun. 1, 2023

(30) Foreign Application Priority Data

Nov. 30, 2021 (JP) ................................ 2021-194162

(51) Int. Cl.
*H04R 3/04* (2006.01)

(52) U.S. Cl.
CPC ........... *H04R 3/04* (2013.01); *H04R 2499/13* (2013.01)

(58) Field of Classification Search
CPC ......... H04R 3/04; H04R 2499/13; H04R 3/14
USPC ............................................................ 381/86
See application file for complete search history.

(56) References Cited

U.S. PATENT DOCUMENTS 5,068,897 A * 11/1991 Yamato et al. ......... H04S 5/005 381/302
5,781,642 A 7/1998 Tanaka et al.
6,775,385 B1 * 8/2004 Coombs .................. H04R 3/04 381/99
6,975,737 B2 * 12/2005 Hirao ...................... H04R 5/02 381/302

(Continued)

FOREIGN PATENT DOCUMENTS

JP S6418398 A 1/1989
JP H04108299 A 4/1992

(Continued)

OTHER PUBLICATIONS

Retro Manufacturing, Ultra-Thin Dash Speakers User's Manual, 2016, Retro Manufacturing LLC, p. 6; https://teslatap.com/articles/audio-systems-for-the-tesla-model-s-and-model-x/ (Year: 2016).*

(Continued)

*Primary Examiner* — Vivian C Chin
(74) *Attorney, Agent, or Firm* — ROSSI, KIMMS & McDOWELL LLP

(57) ABSTRACT

A speaker system is for a vehicle. The speaker system includes a first output system and a second output system. The first output system includes: a first speaker; and a first filter connected to the first speaker, where the first filter is a low-pass filter. The second output system includes: a second speaker disposed above the first speaker, in a state where the first and second speakers are disposed in the vehicle; and a second filter connected to the second speaker. The second filter is a high-pass filter or a bandpass filter. A crossover frequency between a frequency response of the first output system and a frequency response of the second output system is 300 Hz or lower.

6 Claims, 7 Drawing Sheets

(56) References Cited

U.S. PATENT DOCUMENTS

| | | | | |
|---|---|---|---|---|
| 2004/0086130 A1* | 5/2004 | Eid et al. | H04S 7/307 381/20 |
| 2006/0233378 A1* | 10/2006 | Kim et al. | H04S 7/307 381/1 |

FOREIGN PATENT DOCUMENTS

| | | | |
|---|---|---|---|
| JP | H0467895 | U | 6/1992 |
| JP | H05014635 | Y2 | 4/1993 |
| JP | H06025116 | Y2 | 6/1994 |
| JP | H09289697 | A | 11/1997 |
| JP | 2005109969 | A | 4/2005 |
| JP | 2007525083 | A | 8/2007 |
| JP | 2014053684 | A | 3/2014 |
| WO | 2005002278 | A2 | 1/2005 |

OTHER PUBLICATIONS

Notice of Reasons for Refusal issued in Japanese Appln. No. 2021-194162 mailed Jul. 8, 2025. machine translation provided.

First Office Action issued in Chinese Appln. No. 202211454677.3 mailed Dec. 23, 2025. English machine translation provided.

* cited by examiner

SPEAKER SYSTEM FOR A VEHICLE, INCLUDING ONE SPEAKER CONNECTED TO A FIRST-ORDER HIGH PASS FILTER AND ANOTHER SPEAKER CONNECTED TO A SECOND-ORDER LOW-PASS FILTER

CROSS REFERENCE TO RELATED APPLICATION

This Application is based on and claims priority from Japanese Patent Application No. 2021-194162, which is filed on Nov. 30, 2021, and the entire contents of which are incorporated herein by reference.

BACKGROUND

Technological Field

This disclosure relates to a speaker system and, in particular, to a speaker system mounted within a vehicle such as an automobile.

Background Information

A multi-way speaker system includes a channel-dividing network, which divides an input sound signal into different frequency bands, and a dedicated speaker for each frequency band. Documents in the art that describe a multi-way speaker system include Japanese Utility Model Application Publication No. H4-67895, in which there is described division of a sound signal into different frequency bands by using an even-ordered Butterworth filter or an even-ordered Linkwitz-Riley filter.

Known in the art is a three-way speaker system for use in a vehicle, which includes a tweeter for reproducing high-frequency sounds, a squawker for reproducing mid-frequency sounds, and a woofer for reproducing low-frequency sounds. Generally, in such a system a woofer is disposed in a lower part of a door and a squawker is disposed above the woofer so that a sound image of sound reproduced by the squawker is at ear height of a vehicle occupant. However, this speaker arrangement may be problematic if frequency bands of sounds reproduced by the woofer and squawker are not appropriately allocated in the speaker layout. For example, a case can be envisaged in which a speaker system reproduces a singing voice that includes sounds with frequency components of 300 Hz to 500 Hz, and the sound frequency components are allocated such that overlap occurs between a squawker and a woofer. Generally, frequency bands of singing voices range from 400 Hz to 2 kHz, and a singing voice with a frequency of 500 Hz to 2 kHz is output only from a squawker. However, a singing voice with a frequency lower than 500 Hz is output from both the squawker and the woofer. A sound image of a singing voice having frequency components of 500 Hz to 2 kHz reproduced by the squawker is at ear height of the vehicle occupant. On the other hand, a singing voice having frequency components lower than 500 Hz is reproduced by both the squawker and the woofer, and therefore a sound image of sound of the singing voice is positioned between the squawker and the woofer. In other words, a sound image of frequency components of sound of a singing voice lower than 500 Hz moves to a position lower than ear height of the vehicle occupant. Therefore, when a singing voice that includes frequency components of 500 Hz to 2 kHz and frequency components lower than 500 Hz is reproduced, the vehicle occupant senses discomfort since the reproduced singing voice appears to be present at different positions.

SUMMARY

This disclosure has been made in consideration of the circumstances described above and an object thereof is to reduce, in a vehicle-mounted speaker system including a first speaker that is responsible for reproducing low-frequency sounds and a second speaker that is disposed above the first speaker and is responsible for reproducing mid-frequency sounds, a downward shift in a position of a sound image of mid-frequency sounds.

A speaker system according to an aspect of this disclosure is for a vehicle, the speaker system including a first output system including: a first speaker; and a first filter connected to the first speaker, in which the first filter is a low-pass filter; a second output system including: a second speaker disposed above the first speaker, in a state where the first and second speakers are disposed in the vehicle; and a second filter connected to the second speaker, in which the second filter is a high-pass filter or a bandpass filter, in which a crossover frequency between a frequency response of the first output system and a frequency response of the second output system is 300 Hz or lower.

DETAILED DESCRIPTION OF THE EMBODIMENTS

A. Embodiment

Figure 1:
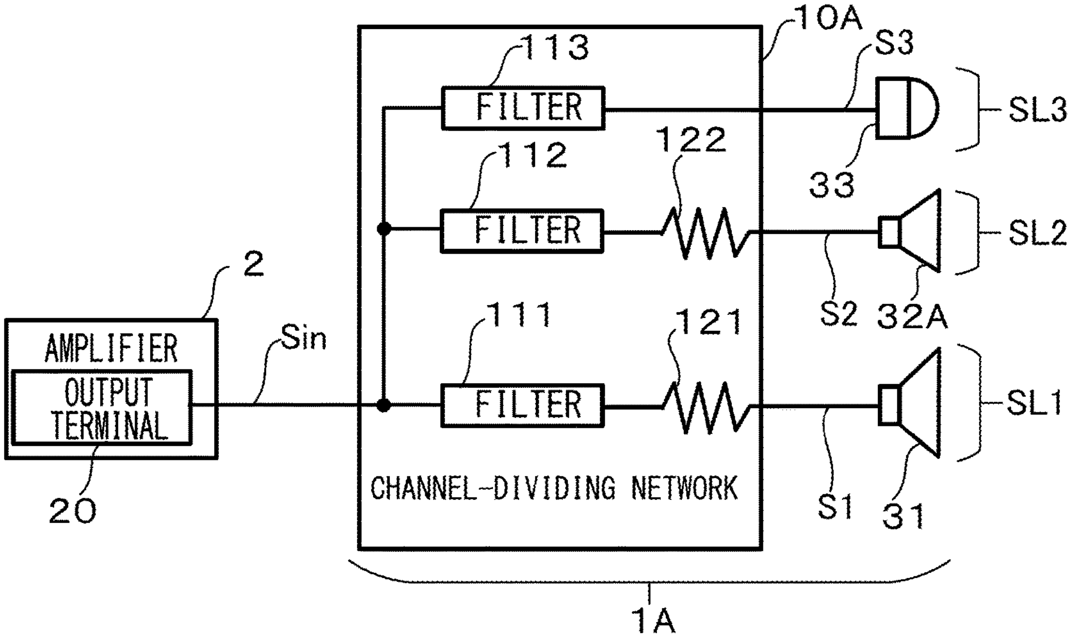
FIG. 1 is a diagram showing an example configuration of a speaker system 1A according to an embodiment of this disclosure.

FIG. 1 is a diagram showing an example configuration of a speaker system 1A according to an embodiment of this disclosure. The speaker system 1A is a three-way speaker system that includes a channel-dividing network 10A, a woofer 31, a squawker 32A, and a tweeter 33. The woofer 31 reproduces low-frequency sounds, the squawker 32A reproduces mid-frequency sounds, and the tweeter 33 reproduces high-frequency sounds. While one each of the woofer 31, the squawker 32A, and the tweeter 33 is illustrated in FIG. 1, the speaker system 1A may include a plurality of sets of speakers made up of the woofer 31, the squawker 32A, and the tweeter 33.

Figure 2:
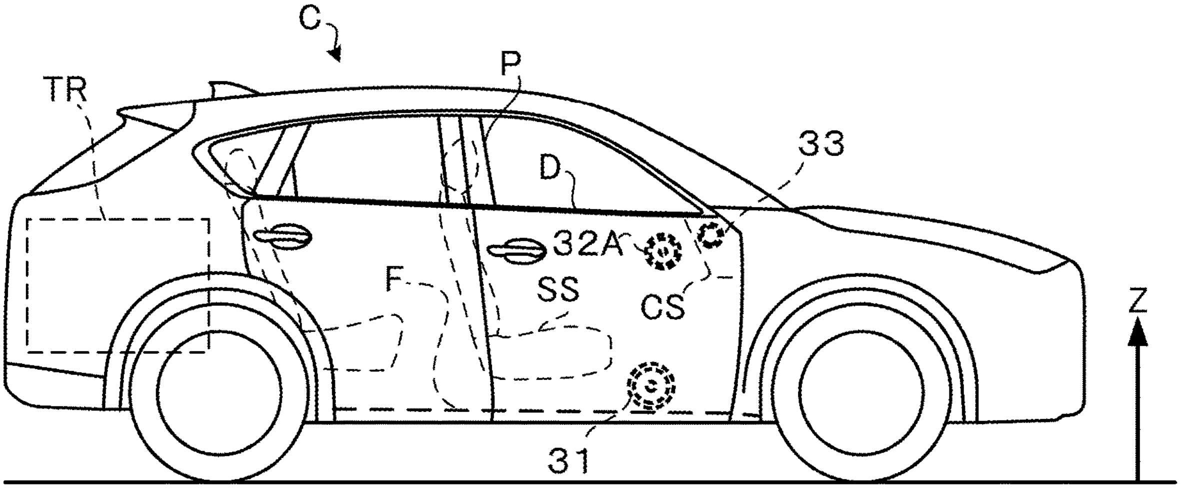
FIG. 2 is a diagram showing an example arrangement of a woofer 31, a squawker 32A, and a tweeter 33 in a vehicle C equipped with the speaker system 1A.

The speaker system 1A is a speaker system that is mounted within a vehicle. FIG. 2 is a diagram showing an example arrangement of the woofer 31, the squawker 32A, and the tweeter 33 in a vehicle C equipped with the speaker system 1A. In the vehicle C, a driver's seat is positioned on a right side and a passenger's seat is positioned on a left side relative to a direction of travel. The vehicle C is used in right-hand drive countries (e.g., Japan, India, the UK, Australia, and some countries in Africa). It is of note that the positions of the driver's seat and the passenger's seat may be reversed. Such a vehicle is used in left-hand countries (e.g., China, Germany, France, Italy, and the US). As shown in FIG. 2, the tweeter 33 is disposed at a position closer to the driver's seat than the passenger's seat in a console CS of the vehicle C. The woofer 31 and the squawker 32A are disposed on a front door D of the driver's seat. More specifically, the woofer 31 is disposed on the front door D at a position closer to a floor F than to a seat surface SS of the driver's seat. On the other hand, the squawker 32A is disposed on the front door D at a position closer to a pillar P than a seat surface SS of the driver's seat so that a position of a sound image obtained by sound reproduced from the squawker 32A is at ear height of an occupant of the driver's seat. In other words, the squawker 32A is disposed above (a vertical direction Z) the woofer 31. In FIG. 2, a reference sign TR denotes a trunk of the vehicle C. The speaker system 1A may include another set of the woofer 31, the squawker 32A, and the tweeter 33. In this case, the woofer 31 and the squawker 32A may be provided on a front door of the passenger's seat and the tweeter 33 may be provided at a position closer to the passenger's seat than to the driver's seat in the console CS.

Figure 3:
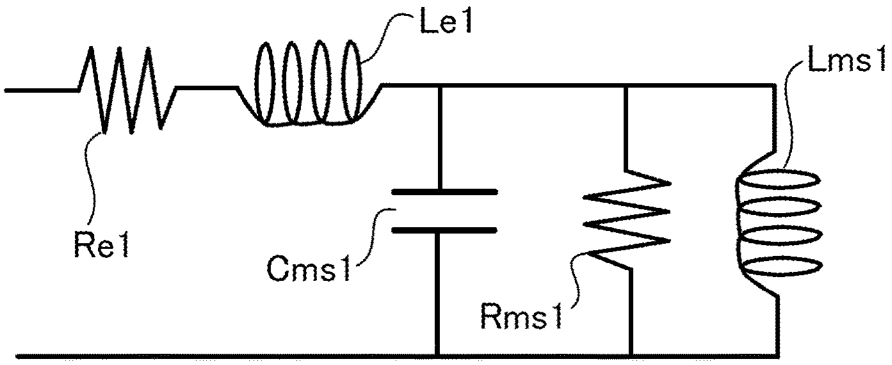
FIG. 3 is a diagram showing an example of an equivalent circuit of a speaker.

In this embodiment, an impedance of each of the woofer 31, the squawker 32A, and the tweeter 33 has an impedance of 4Ω, which is similar to the impedance of a general speaker. The impedance of each of the woofer 31, the squawker 32A, and the tweeter 33 is calculated by a simulation based on an equivalent circuit shown in FIG. 3. FIG. 3 is a diagram showing an example of an equivalent circuit of a speaker. In FIG. 3, an inductance of an inductor Le1 is a parameter corresponding to an inductance of a voice coil of a speaker and a resistance value of a resistor Re1 is a parameter corresponding to a direct-current resistance of a voice coil of the speaker. A capacitance of a capacitor Cms1, which is an inductance of an inductor Lms1, and a resistance value of a resistor Rms1 in FIG. 3 are parameters based on a cone, a damper, and an edge of the speaker.

The channel-dividing network 10A shown in FIG. 1 divides a sound signal Sin input to the speaker system 1A into a low-frequency sound signal S1, a mid-frequency sound signal S2, and a high-frequency sound signal S3. The sound signal S1 is supplied to the woofer 31, the sound signal S2 is supplied to the squawker 32A, and the sound signal S3 is supplied to the tweeter 33.

Besides the speaker system 1A, FIG. 1 illustrates an amplifier 2 that supplies the speaker system 1A with the sound signal Sin. The amplifier 2 includes an output terminal 20 for outputting the sound signal Sin. The channel-dividing network 10A is connected to the output terminal 20. A sound signal is supplied to the amplifier 2 from a vehicle-mounted audio player such as a CD (Compact Disk) player. In FIG. 1, illustration of the vehicle-mounted audio player that supplies the amplifier 2 with a sound signal is omitted. The sound signal supplied from the vehicle-mounted audio player to the amplifier 2 is, for example, a sound signal representative of a singing voice. The amplifier 2 amplifies the sound signal supplied from the vehicle-mounted audio apparatus. The amplifier 2 outputs the amplified sound signal from the output terminal 20 as a sound signal Sin.

As shown in FIG. 1, the channel-dividing network 10A has a filter 111, a filter 112, a filter 113, a resistor 121, and a resistor 122. In this embodiment, a resistance value of the resistor 121 is 0.5Ω and a resistance value of the resistor 122 is 1Ω. The filter 111 and the resistor 121 are connected in series between the output terminal 20 of the amplifier 2 and the woofer 31. The filter 111, the resistor 121, and the woofer 31 comprise an output system SL1 that outputs low-frequency sound. The filter 112 and the resistor 122 are connected in series between the output terminal 20 and the squawker 32A. The filter 112, the resistor 122, and the squawker 32A comprise an output system SL2 that outputs mid-frequency sound. The filter 113 is provided between the output terminal 20 and the tweeter 33. In this embodiment, the filter 113 and the tweeter 33 comprise an output system SL3 that outputs high-frequency sound.

The filter 111 is a low-pass filter. In this embodiment, a cutoff frequency of the filter 111 is set to 288 Hz. The filter 111 generates the sound signal S1 by attenuating frequency components with a frequency higher than 288 Hz within the sound signal Sin supplied from the amplifier 2. A cutoff frequency refers to a frequency at a boundary between a passband and a stopband of a filter. More specifically, a cutoff frequency is a frequency at which attenuation of an output signal of a filter relative to an input signal is 3 dB.

The filter 112 is a high-pass filter. In this embodiment, a cutoff frequency of the filter 112 is set to 276 Hz. The filter 112 generates the sound signal S2 by attenuating frequency components with a lower frequency than 276 Hz within the sound signal Sin supplied from the amplifier 2. The filter 113 is a high-pass filter similar to the filter 112. In this embodiment, a cutoff frequency of the filter 113 is set to 9.8 kHz. The filter 113 generates the sound signal S3 by attenuating frequency components with a frequency lower than 9.8 kHz within the sound signal Sin supplied from the amplifier 2.

While the cutoff frequency of the filter 111 according to this embodiment is 288 Hz, the cutoff frequency of the filter 111 is not limited to 288 Hz as long as the cutoff frequency is equal to or lower than 300 Hz. When the cutoff frequency of the filter 111 is set higher than 300 Hz, sound at frequencies near 300 Hz is output with high sound pressure from the woofer 31. In the this embodiment, sound in frequency bands equal to or higher than 300 Hz is mainly output from the squawker 32A. If the cutoff frequency of the filter 111 is higher than 300 Hz, sound at frequencies near 300 Hz would be output from the woofer 31. As a result, a position of a sound image of sound at frequencies near 300 Hz would shift downward along a vertical axis Z from a position at ear height of an occupant of the driver's seat. Therefore, in order to reduce a downward shift of the position of the sound image of sound at frequencies near 300 Hz, the cutoff frequency of the filter 111 is preferably equal to or lower than 300 Hz.

Figure 4:
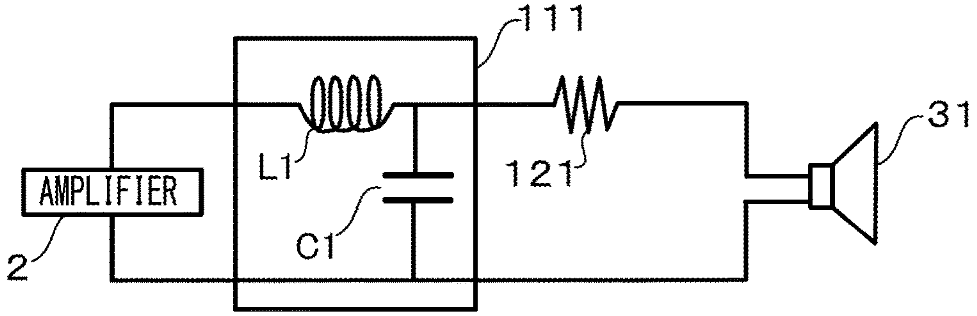
FIG. 4 is a diagram showing an example configuration of a filter 111.
Figure 5:
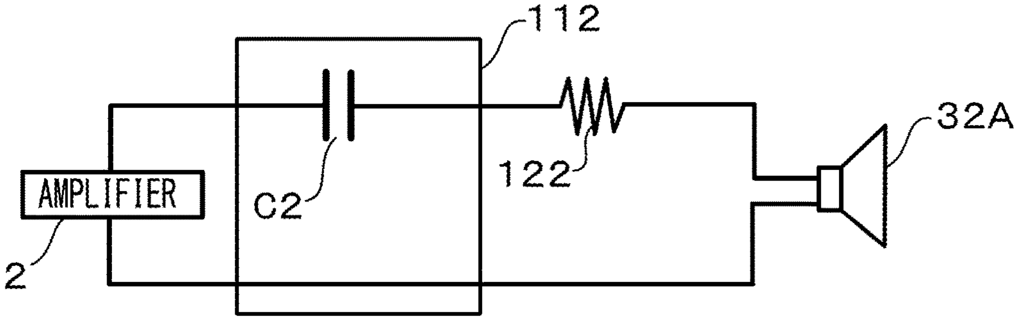
FIG. 5 is a diagram showing an example configuration of a filter 112.

FIG. 4 is a diagram showing an example configuration of the filter 111. In addition to the filter 111, FIG. 4 illustrates the amplifier 2, the resistor 121, and the woofer 31. As shown in FIG. 4, the filter 111 is a second-order low-pass filter that comprises an inductor L1 and a capacitor C1. FIG. 5 is a diagram showing an example configuration of the filter 112. In addition to the filter 112, FIG. 5 also illustrates the amplifier 2, the resistor 122, and the squawker 32A. As shown in FIG. 5, the filter 112 is a first-order high-pass filter solely comprising the capacitor C2. The filter 113 is a first-order high-pass filter similar to the filter 112.

Figure 6:
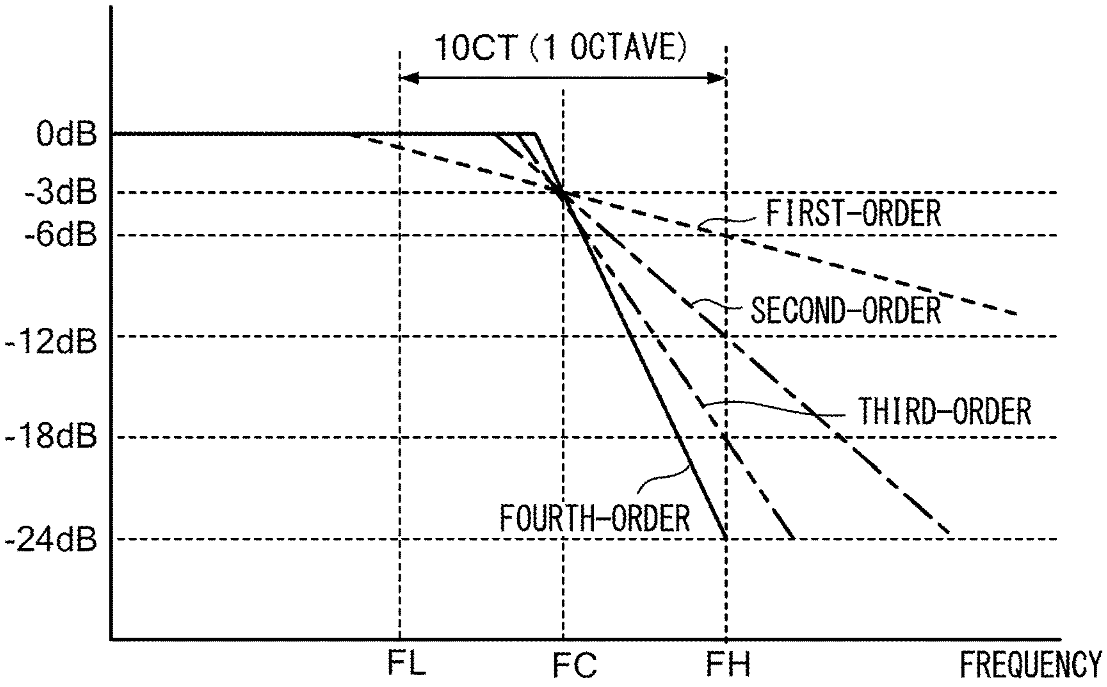
FIG. 6 is a diagram showing frequency responses of first-order, second-order, third-order, and fourth-order low-pass filters.

FIG. 6 is a diagram showing frequency responses of first-order, second-order, third-order, and fourth-order low-pass filters. Reference sign FC in FIG. 6 denotes a cutoff frequency. Reference sign FL denotes a lower limit frequency of a frequency band of one octave centered on the cutoff frequency, and reference sign FH denotes an upper limit frequency of the frequency band. The frequency responses of the first-order, second-order, third-order, and fourth-order high-pass filters are obtained by laterally inverting the frequency responses shown in FIG. 6 relative to the cutoff frequency. As shown in FIG. 6, attenuation in a stopband of a high-order filter is steeper than that of a low-order filter. In addition, the number of passive devices that comprise a high-order filter increases as compared to a low-order filter.

Generally, since a woofer is capable of outputting sound up to 4 kHz, it is desirable that attenuation in the stopband of the filter 111 is steep so as to reduce a downward shift of a position of a sound image of sound reproduced by the squawker 32A from a position at ear height of an occupant. This is because the frequency band of sound reproduced by the squawker 32A and the frequency band of sound reproduced by the woofer 31 preferably do not overlap with each other. Therefore, in this embodiment, a second-order low-pass filter is used as the filter 111. Attenuation in the stopband is steeper in a second-order low-pass filter than in a first-order low-pass filter.

On the other hand, since the filter 112 is a first-order high-pass filter, the sound signal S2 output from the filter 112 may include a signal component with a lower frequency than the cutoff frequency of the filter 112 that is not sufficiently attenuated. Therefore, interference between the sound reproduced by the woofer 31 and the sound reproduced by the squawker 32A may occur in a frequency band lower than the cutoff frequency of the filter 112. However, the sound reproduced by the squawker 32A generally attenuates in frequency bands lower than 200 Hz. In addition, since frequency bands lower than 200 Hz are below the lower limit of frequency bands of a singing voice, namely 400 Hz, a sound quality of a singing voice reproduced by the speaker system 1A is not affected.

In this embodiment, since the filter 112 and the filter 113 are both first-order high-pass filters, interference may occur between sound reproduced by the squawker 32A and sound reproduced by the tweeter 33. However, since a frequency band in which the sound reproduced by the squawker 32A and the sound reproduced by the tweeter 33 overlap with each other is sufficiently high, an influence of phase interference is small, and is not problematic.

Figure 7:
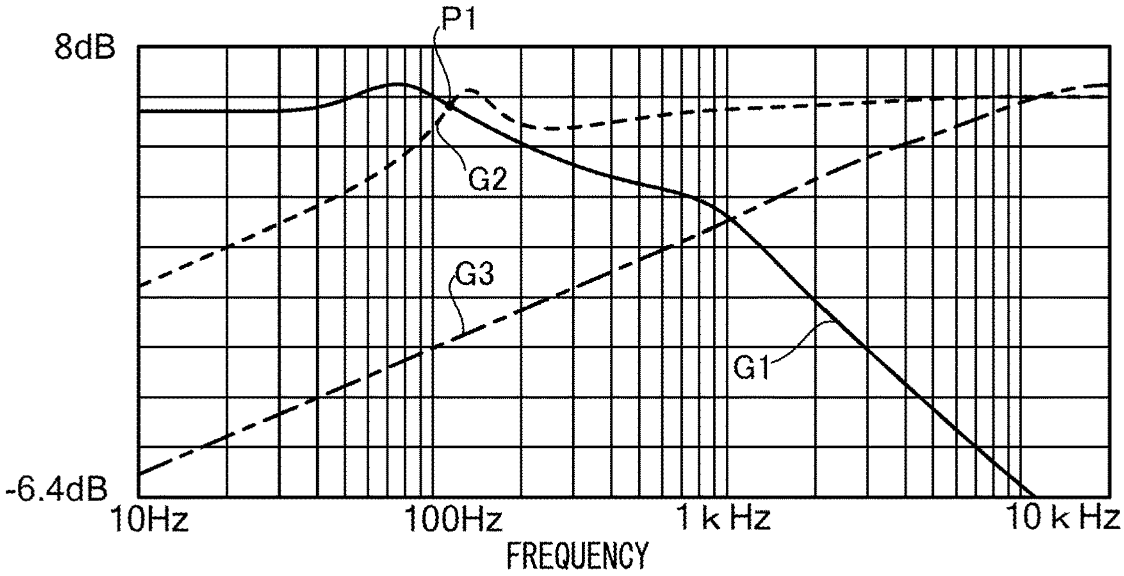
FIG. 7 is a diagram showing an example of frequency responses of the filter 111, the filter 112, and a filter 113.

FIG. 7 shows a graph G1 of a frequency response of the filter 111, a graph G2 of a frequency response of the filter 112, and a graph G3 of a frequency response of the filter 113. A crossover frequency between the frequency response of the output system SL1 and the frequency response of the output system SL2 is determined in accordance with an intersection P1 of the graph G1 and the graph G2. The crossover frequency between the frequency response of the output system SL1 and the frequency response of the output system SL2 refers to a frequency at which the frequency response of the output system SL1 and the frequency response of the output system SL2 intersect each other. In this embodiment, the cutoff frequency of the filter 112 is set to 276 Hz in order to keep the crossover frequency at or below 300 Hz.

Figure 8:
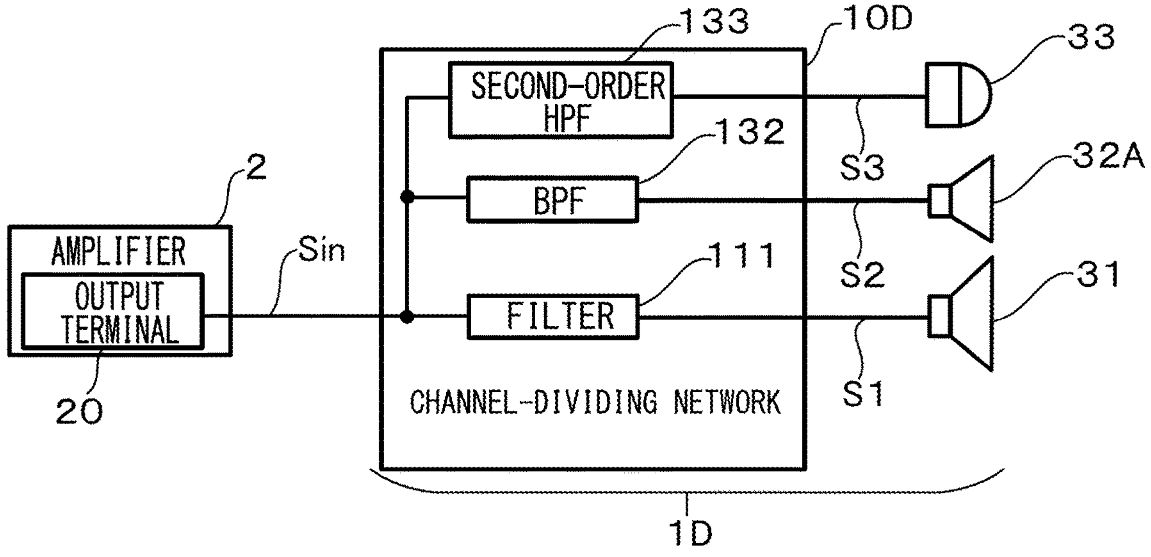
FIG. 8 is a diagram showing an example configuration of a basic speaker system 1D.

An advantage of this embodiment will now be described. For purposes of comparison, a basic three-way speaker system will be described. FIG. 8 is a diagram showing an example configuration of a speaker system 1D, which is an example of a basic three-way speaker system. Comparing the speaker system 1D and the speaker system 1A, the speaker system 1D differs from the speaker system 1A in that the speaker system 1D includes a channel-dividing network 10D instead of the channel-dividing network 10A. The channel-dividing network 10D differs from the channel-dividing network 10A in the following three points of difference. The first difference is that a second-order high-pass filter 133 is used to generate the sound signal S3. The second difference is that a bandpass filter 132 is used to generate the sound signal S2. A bandpass filter 132 is formed by connecting in series a second-order high-pass filter and a second-order low-pass filter. The third difference is that the resistor 121 and the resistor 122 are not included.

It is desirable to reduce a number of components that comprise a three-way speaker system to be mounted within the vehicle C. To reduce the number of components of the speaker system 1D shown in FIG. 8, the high-pass filter 133 may be replaced with the filter 113 and the bandpass filter 132 may be replaced with the filter 112, as is the case in the speaker system 1E shown in FIG. 9. Replacing the high-pass filter 133 with the filter 113 enables one inductor to be omitted. Replacing the bandpass filter 132 with the filter 112 enables a low-pass filter to be omitted and, at the same time, another inductor to be omitted. As described earlier, using a first-order high-pass filter to generate the sound signal S3 and a first-order high-pass filter to generate the sound signal S2 does not adversely affect sound quality. As will be apparent from a comparison of FIG. 9 and FIG. 1, a channel-dividing network 10E in the speaker system 1E differs from the channel-dividing network 10A in that the channel-dividing network 10E does not include the resistor 121 and the resistor 122.

Figure 9:
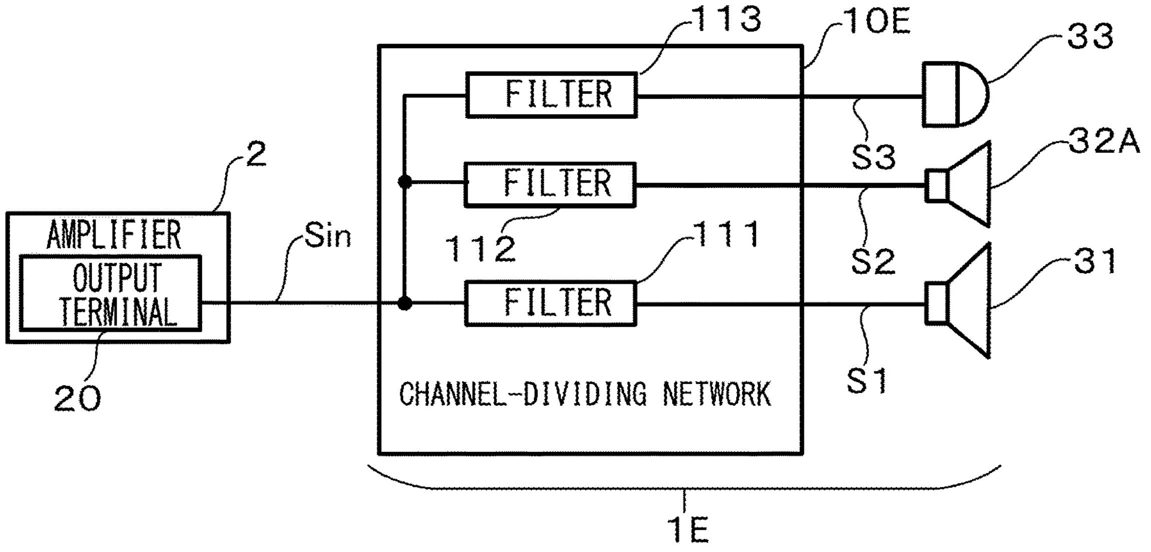
FIG. 9 is an example configuration of a speaker system 1E created by reducing the number of components of the basic speaker system 1D.

In the speaker system 1E shown in FIG. 9, the cutoff frequency of the filter 112 is set higher than the cutoff frequency of the filter 111, for the following reasons. When the cutoff frequency of the filter 112 and the cutoff frequency of the filter 111 are approximately equal to each other in the speaker system 1E, a sound signal with a frequency near the cutoff frequencies is supplied to the woofer 31 and the squawker 32A. The filter 112 being a first-order high-pass filter means that at frequencies near the cutoff frequencies the squawker 32A is substantially connected in parallel to the woofer 31. A combined impedance of the woofer 31 and the squawker 32A connected in parallel to the amplifier 2 is lower than that of the woofer 31 alone or of the squawker 32A alone. As impedance declines, there is a risk that overcurrent may occur in the amplifier 2. To reduce occurrence of overcurrent in the speaker system 1E, the cutoff frequency of the filter 112 is set higher than the cutoff frequency of the filter 111.

Figure 10:
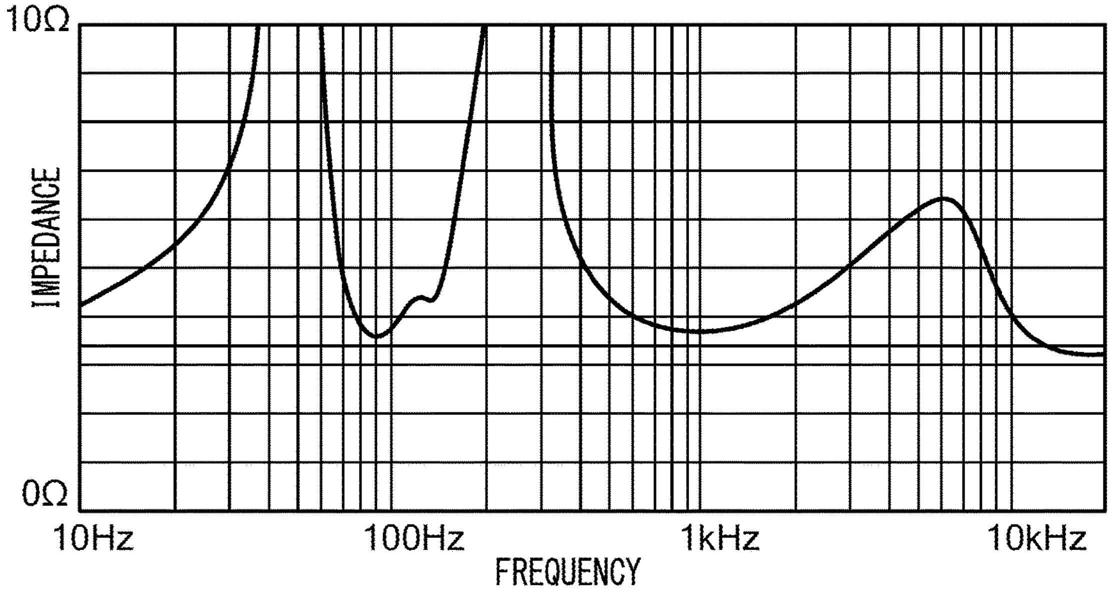
FIG. 10 is a diagram showing an example of a frequency response of impedance in the speaker system 1E when a cutoff frequency of the filter 112 is set to 464 Hz.

FIG. 10 is a diagram showing an example of a frequency response of impedance when the cutoff frequency of the filter 112 is set to 464 Hz and the cutoff frequency of the filter 111 is set to 288 Hz, as viewed from the output terminal 20 of the speaker system 1E. In the example shown in FIG. 10, since impedance in the frequency band of 200 to 500 Hz is higher than 4Ω, which is the impedance of the woofer 31 alone, and is the impedance of the squawker 32A alone, overcurrent in the amplifier 2 is avoided in this frequency band.

Figure 11:
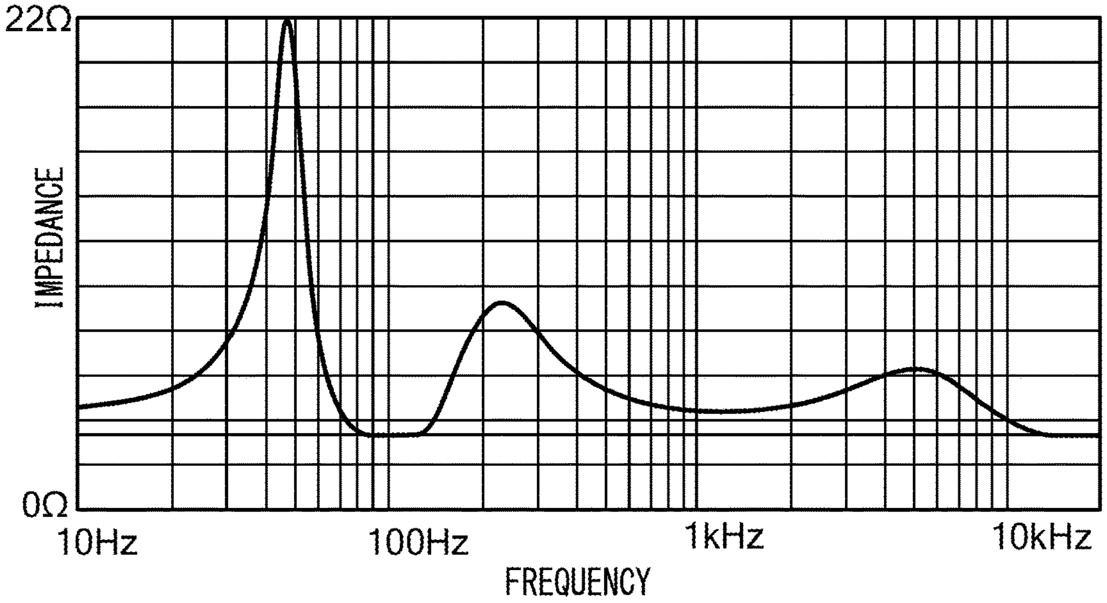
FIG. 11 is a diagram showing an example of a frequency response of impedance in the speaker system 1A.

However, when the cutoff frequency of the filter 112 is set higher than the cutoff frequency of the filter 111 in the speaker system 1E, since linkage between a frequency band of sound output from the squawker 32A and a frequency band of sound output from the woofer 31 deteriorates, sound quality is adversely affected. The resistor 121 and the resistor 122 in the speaker system 1A are provided to prevent occurrence of overcurrent even when the cutoff frequency of the filter 112 is set to an approximately equivalent value to that of the filter 111. FIG. 11 is a diagram showing an example of a frequency response of impedance in the speaker system 1A. In the example shown in FIG. 10, since impedance in the frequency band of 200 to 500 Hz is higher than 4Ω, which is the impedance of the woofer 31 alone, and is the impedance of the squawker 32A alone, overcurrent in the amplifier 2 is avoided in this frequency band.

Figure 12:
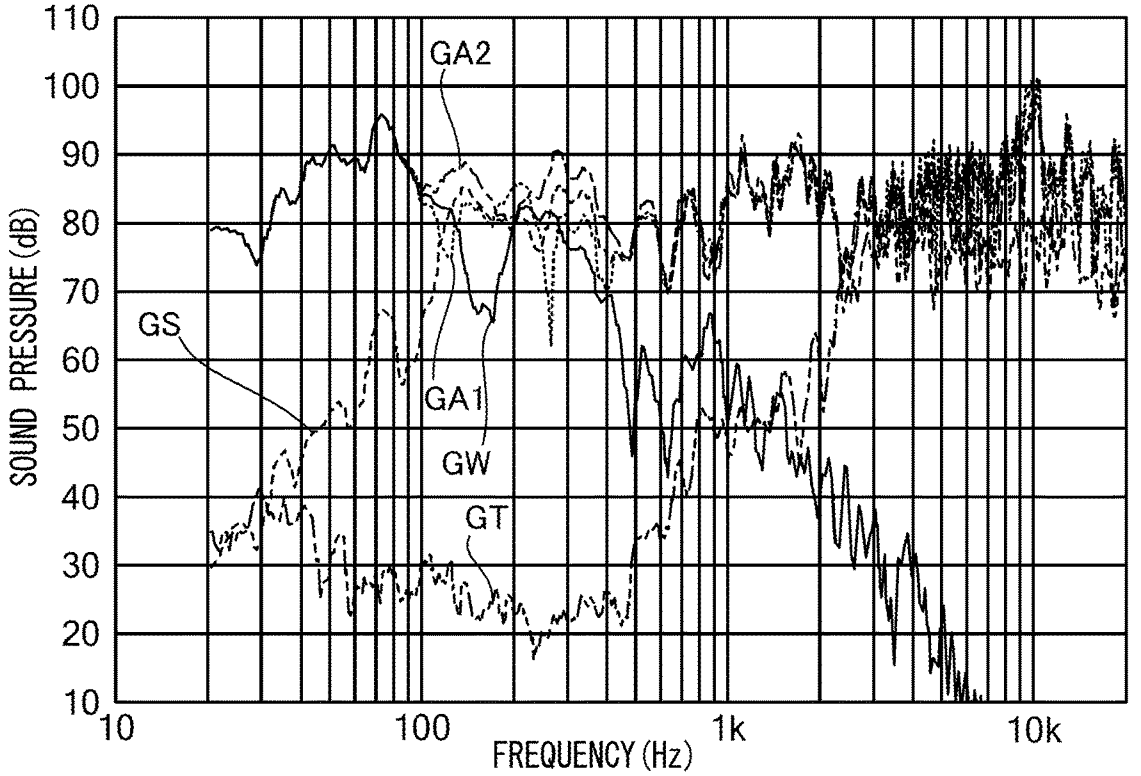
FIG. 12 is a diagram showing an example of a measurement result of sound pressure per frequency of sound reproduced by the speaker system 1A.

FIG. 12 is a diagram showing an example of a measurement result of sound pressure per frequency of sound reproduced by the speaker system 1A within the vehicle C. In FIG. 12, a graph GW shows a measurement result for sound reproduced by the woofer 31 alone, a graph GS shows a measurement result for sound reproduced by the squawker 32A alone, and a graph GT shows a measurement result for sound reproduced by the tweeter 33 alone. In FIG. 12, a graph GA1 and a graph GA2 show measurement results of sound obtained by overlapping sounds reproduced by each of the woofer 31, the squawker 32A, and the tweeter 33. More specifically, the graph GA1 shows a measurement result when the sound reproduced by the woofer 31 and the sound reproduced by the squawker 32A are in phase, while the graph GA2 shows a measurement result when the sound reproduced by the woofer 31 and the sound reproduced by the squawker 32A are in opposite phase. As will be apparent from graph GA1 and graph GA2 in FIG. 12, since sound reproduced by the speaker system 1A does not have frequency bands in which there is a significant drop in sound pressure, sound quality in a specific frequency band does not markedly deteriorate.

According to the speaker system 1A of this embodiment, a downward shift in a position of a sound image of sound reproduced by the squawker 32A is reduced. In addition, according to the speaker system 1A of this embodiment, a three-way speaker system can be constructed with a comparatively small number of components. Furthermore, according to this embodiment, overcurrent in the amplifier 2 is avoided without any reduction in sound quality which would otherwise occur as a result of a deterioration in linkage between a frequency band of sound output from the squawker 32A and a frequency band of sound output from the woofer 31.

B. Modifications

The embodiment described above may be modified as follows.

(1) First Modification

The filter 112 in the speaker system 1A is a high-pass filter, the filter 112 may be a bandpass filter. However, since a bandpass filter is formed by connecting a high-pass filter and a low-pass filter in series, using a high-pass filter as the filter 112 as in the foregoing embodiment enables the number of components that comprise the speaker system 1A to be reduced as compared to an aspect in which a bandpass filter is used as the filter 112.

(2) Second modification

Any one of or both of the filter 112 and the filter 113 may be second-order filters. It is of note that a second-order filter comprises a larger number of components. In the foregoing embodiment, both the filter 112 and the filter 113 are first-order filters. For this reason, the foregoing embodiment provides advantages in that the number of components that make up the speaker system 1A is reduced as compared to this second modification.

(3) Third Modification

Figure 13:
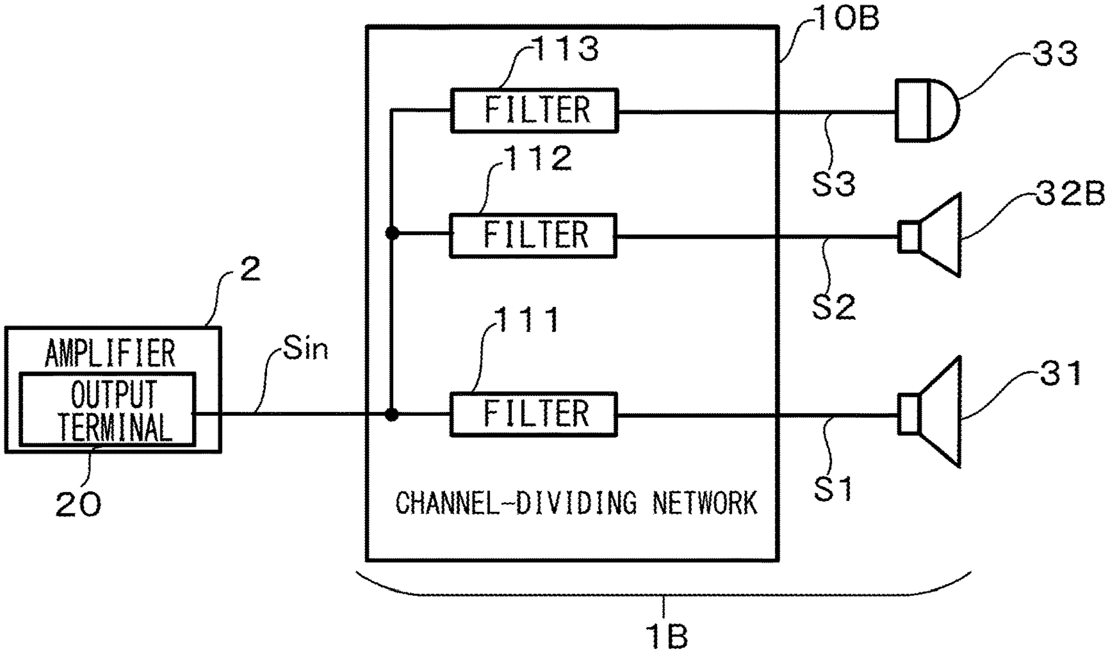
FIG. 13 is a diagram showing an example configuration of a speaker system 1B according to a third modification.

In the speaker system 1A, provision of the resistor 121 and the resistor 122 reduces occurrence of overcurrent attributable to setting the cutoff frequency of the filter 112 to a value equivalent to the cutoff frequency of the filter 111. However, the resistor 122 can be omitted if an impedance of the squawker 32A is high. In addition, the resistor 121 can be omitted if a direct-current resistance component of the voice coil in the woofer 31 acts as the resistor 121. In other words, the resistor 121 and the resistor 122 can be omitted. For example, a speaker system 1B shown in FIG. 13 differs from the speaker system 1A in that the speaker system 1B does not include the resistor 121 and the resistor 122, and in that a squawker 32B is provided instead of the squawker 32A. An impedance of the squawker 32B is set to a higher value than an impedance of a general speaker or to 5Ω. In the speaker system 1B, the direct-current resistance component of the voice coil in the woofer 31 acts as the resistor 121.

(4) Fourth Modification

Figure 14:
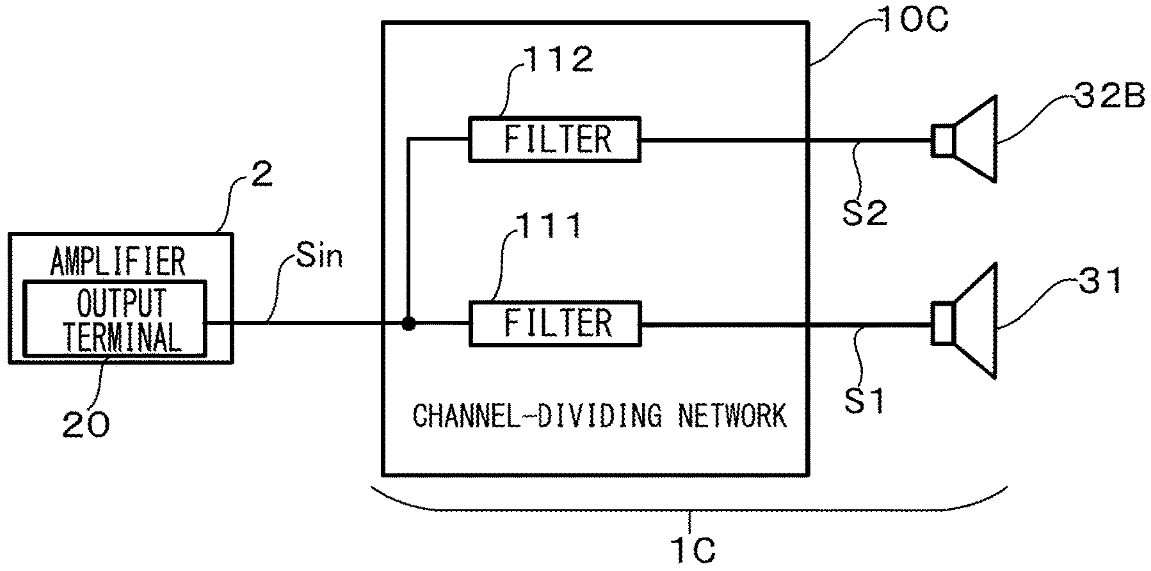
FIG. 14 is a diagram showing an example configuration of a speaker system 1C according to a fourth modification.

In this disclosure, the speaker system 1A and the speaker system 1B are example applications to a three-way vehicle-mounted speaker system. However, an object of application of this disclosure is not limited to a three-way vehicle-mounted speaker system and this disclosure may be applied to a two-way vehicle-mounted speaker system. FIG. 14 is a diagram showing an example configuration of a speaker system 1C that is an application of this disclosure to a two-way vehicle-mounted speaker system comprising the woofer 31 and the squawker 32B. As will be apparent in comparing FIG. 14 and FIG. 13, the speaker system 1C differs from the speaker system 1B in the following two points. The first difference is that the speaker system 1C does not include the tweeter 33. The second difference is that the speaker system 1C includes a channel-dividing network 10C instead of a channel-dividing network 10B. The channel-dividing network 10C differs from the channel-dividing network 10B in that the channel-dividing network 10C does not include the filter 113.

(5) Fifth Modification

The woofer 31 is disposed on the front door D of the driver's seat in the vehicle C in the embodiment described above. However, the woofer 31 may be disposed between the console CS and the floor F or in the trunk TR of the vehicle C. In addition, the squawker 32A may be disposed on the pillar P in the vehicle C. The pillar P is a column that connects the roof and the body. In short, the squawker 32A need only be positioned above (in the vertical direction Z) the woofer 31.

C. Aspects Obtained from Each Embodiment and Modification

This disclosure is not limited to the embodiment and modifications described above and can be implemented in various aspects without departing from the gist of the disclosure. For example, this disclosure can also be implemented in the following aspects. The technical features in the embodiment described above that correspond to technical features in each aspect described below may be replaced or combined as deemed appropriate in order to solve a part of or all of the problems described in the summary of this disclosure or to achieve a part of or all of the advantageous effects of this disclosure. In addition, if the technical feature is not described as being essential in this specification, the technical feature can be deleted as deemed appropriate.

A speaker system 1A according to an aspect of this disclosure includes a woofer 31, a squawker 32A, a filter 111, and a filter 112. The woofer 31 and the squawker 32A are disposed in a vehicle C with the speaker system 1A. The woofer 31 is an example of the first speaker according to this disclosure. The squawker 32A is positioned above (in a vertical direction Z) the woofer 31. The squawker 32A is an example of the second speaker according to this disclosure. The filter 111 is a low-pass filter. The filter 111 is disposed between an output terminal 20 of an amplifier 2, which outputs a sound signal Sin, and the woofer 31. The filter 111 and the woofer 31 comprise an output system SL1. The filter 111 is an example of the first filter according to this disclosure. The output system SL1 is an example of the first output system according to this disclosure. The filter 112 is a high-pass filter or a bandpass filter. The filter 112 is disposed between the output terminal 20 and the squawker 32A. The filter 112 and the squawker 32A comprise an output system SL2. The filter 112 is an example of the second filter according to this disclosure. The output system SL2 is an example of the second output system according to this disclosure. In the speaker system 1A, a crossover frequency between a frequency response of the output system SL1 and a frequency response of the output system SL2 is 300 Hz or lower. According to the speaker system 1A, a downward shift of a position of a sound image of sound reproduced by the squawker 32A is reduced while avoiding a decline in sound quality of sound reproduced by the woofer 31 and the squawker 32A. The woofer 31 may be disposed on a door of the vehicle C, between a console and a floor of the vehicle, or in a trunk of the vehicle, and the squawker may be disposed on a door of the vehicle C or on a pillar P of the vehicle C.

The filter 112 is preferably a high-pass filter. When the filter 112 is a high-pass filter, the number of components that comprise the speaker system 1A can be reduced as compared to when the filter 112 is a bandpass filter.

The speaker system 1A may include a tweeter 33 and a filter 113 disposed between the output terminal 20 and the tweeter 33, and the filter 113 is preferably a high-pass filter. According to this aspect, a three-way speaker system can be constructed with a smaller number of components than before while reducing a downward shift of a position of a sound image. The tweeter 33 is an example of the third speaker according to this disclosure. The filter 113 is an example of the third filter according to this disclosure.

At least one of the filter 112 and the filter 113 is preferably a first-order filter. In other words, only the filter 112 may be a first-order filter, only the filter 113 may be a first-order filter, or both the filter 112 and the filter 113 may be first-order filters. According to this aspect, the number of components that comprise the speaker system 1A can be reduced as compared to an aspect in which both the filter 112 and the filter 113 are made of second-order filters.

The speaker system 1A may further include at least one of a resistor 121 to be connected in series between the filter 111 and the woofer 31 and a resistor 122 to be connected in series between the filter 112 and the squawker 32A. In other words, the speaker system 1A may further include only the resistor 121, further include only the resistor 122, or further include both the resistor 121 and the resistor 122. The resistor 121 is an example of the first resistor according to this disclosure. The resistor 122 is an example of the second resistor according to this disclosure. According to this aspect, overcurrent can be prevented in the amplifier 2 since the crossover frequency between the frequency response of the output system SL1 and the frequency response of the output system SL2 is 300 Hz or lower.

A squawker 32B with an impedance of 5Ω or more can be used instead of the squawker 32A. According to this aspect, overcurrent can be prevented in the amplifier 2 since the crossover frequency between the frequency response of the output system SL1 and the frequency response of the output system SL2 is 300 Hz or lower.

DESCRIPTION OF REFERENCE SIGNS

1A, 1B, 1C, 1D, 1E Speaker system
10A, 10B, 10C, 10D, 10E Channel-dividing network
111, 112, 113 Filter
121, 122 Resistor
2 Amplifier
20 Output terminal
31 Woofer
32A, 32B Squawker
33 Tweeter

What is claimed is:

1. A speaker system for a vehicle, the speaker system comprising:
- a first output system including:
  - a first speaker configured to reproduce sound other than singing voice, the singing voice being in a frequency range of 400 Hz to 2 kHz; and
  - a first filter, which provides a first cutoff frequency, connected to the first speaker, wherein the first filter is a second-order low-pass filter;
- a second output system including:
  - a second speaker configured to reproduce the singing voice and disposed above the first speaker, in a state where the first and second speakers are disposed in the vehicle; and
  - a second filter, which provides a second cutoff frequency, connected to the second speaker, wherein the second filter is a first-order high-pass filter that allows a signal component with a lower frequency than the second cutoff frequency of the second filter to pass,
- wherein the first speaker is arranged to be disposed on a door of the vehicle, between a console and a floor of the vehicle, or in a trunk of the vehicle,
- wherein the second speaker is arranged to be disposed on the door or on a pillar of the vehicle so that the second speaker is disposed higher than the first speaker, and
- wherein the first cutoff frequency of the first filter is set at 300 Hz or lower but higher than the second cutoff frequency of the second filter to provide a crossover frequency between a frequency response of the first speaker and a frequency response of the second speaker to be 300 Hz or lower to prevent a lower range of the singing voice from being output from both the first and second speakers to prevent position shifting of a sound image of the singing voice.

2. The speaker system according to claim 1, further comprising a third output system including:

a third speaker; and a third filter connected to the third speaker, wherein the third filter is a high-pass filter.

3. The speaker system according to claim 2, wherein the third filter is a first-order high-pass filter.

4. The speaker system according to claim 1, further comprising at least one of:

a first resistor connected in series between the first filter and the first speaker, or a second resistor connected in series between the second filter and the second speaker.

5. The speaker system according to claim 1, wherein an impedance of the second speaker is 5 Ω or greater.

6. A method of improving a sound image in a speaker system for a vehicle, the speaker system including:

a first output system including:

a first speaker configured to reproduce sound other than singing voice, the singing voice being in a frequency range of 400 Hz to 2 kHz; and a first filter, which provides a first cutoff frequency, connected to the first speaker, wherein the first filter is a second-order low-pass filter;

a second output system including:

a second speaker configured to reproduce the singing voice; and a second filter, which provides a second cutoff frequency, connected to the second speaker, wherein the second filter is a first-order high-pass filter that allows a signal component with a lower frequency than the second cutoff frequency of the second filter to pass, the method comprising:

disposing the first speaker on a door of the vehicle, between a console and a floor of the vehicle, or in a trunk of the vehicle;

disposing the second speaker on the door or on a pillar of the vehicle so that the second speaker is disposed higher than the first speaker; and configuring the first cutoff frequency of the first filter at 300 Hz or lower but higher than the second cutoff frequency of the second filter to provide a crossover frequency between a frequency response of the first speaker and a frequency response of the second speaker to be 300 Hz or lower to prevent a lower range of the singing voice from being output from both the first and second speakers to prevent position shifting of a sound image of the singing voice.

* * * * *